United States Patent [19]

Hall

[11] Patent Number: 5,278,849
[45] Date of Patent: Jan. 11, 1994

[54] METHOD AND APPARATUS FOR IDENTIFYING VALID DATA CELLS IN A REDUNDANT PAIR COMBINING UNIT OF AN ASYNCHRONOUS TRANSFER MODE SWITCH

[75] Inventor: Robert M. Hall, Bassett, United Kingdom

[73] Assignee: GEC Plessey Telecommunication Limited, Coventry, United Kingdom

[21] Appl. No.: 676,172

[22] Filed: Mar. 28, 1991

[51] Int. Cl.$^5$ ............................................... H04L 1/00
[52] U.S. Cl. ...................... 371/57.1; 371/60
[58] Field of Search ............... 371/8.2, 30, 57.1, 57.2, 371/60, 32, 33

[56] References Cited

U.S. PATENT DOCUMENTS

| | | | |
|---|---|---|---|
| 4,852,127 | 7/1989 | Fraser et al. | 371/34 |
| 5,022,025 | 6/1991 | Urushidani et al. | 370/60 |
| 5,163,054 | 11/1992 | Nagy | 371/32 |
| 5,168,497 | 12/1992 | Ozaki et al. | 371/32 |

FOREIGN PATENT DOCUMENTS 0384936  9/1990  European Pat. Off.

Primary Examiner—Charles E. Atkinson
Attorney, Agent, or Firm—Spencer, Frank & Schneider

[57] ABSTRACT

Identifying valid data cells of a call in a redundant path combining unit of an asynchronous transfer mode switch having duplicated switching planes includes identifying the plane of the last data cell to be passed in respect of a particular call, checking that a sequence number associated with the data cell is not one greater than that stored in a storage device, checking that the last data cell to be passed on the particular call was from the same plane, checking if the data cell is a duplicate of the last data cell to arrive on this plane, and passing the data cell to an output store if (c) is true and (d) is not true and storing in the storage device the sequence number of the data cell. A transceiver receives and transmits data and a first store is connected to the transceiver for storing plane identification data and data cell sequence number data. A second store stores a call identifier used to address the first store and a sequence number related to a particular call, for presentation to an addressed location in the first store. A first comparator receives the sequence number from the second store and a sequence number from the first store and compares these numbers, while a second comparator receives the sequence number from the second store, and the sequence number from the first store by way of an incrementer which increments the sequence number by one, and compares the numbers. Data cell acceptance logic circuitry is connected to the first and second comparators and generates read and write control signals for the first store, in accordance with output signals generated by the first and second comparators.

2 Claims, 3 Drawing Sheets

METHOD AND APPARATUS FOR IDENTIFYING VALID DATA CELLS IN A REDUNDANT PAIR COMBINING UNIT OF AN ASYNCHRONOUS TRANSFER MODE SWITCH

BACKGROUND OF THE INVENTION

1. Field of the Invention

The present invention relates to a method and apparatus for identifying valid data cells in a redundant path combining unit of an asynchronous transfer mode switch having duplicated switching planes.

2. BACKGROUND INFORMATION

In a known type of validity checking apparatus, the redundant path combining unit is arranged to look at a sequence number attached to each data cell, to detect whether the sequence number matches that stored in a RAM or is greater by one. If either of these conditions are satisfied the data cell is considered valid and the sequence number is incremented.

A disadvantage of this form of validity checking is that if the same two consecutive data cells are lost from both planes, the redundant path combining unit would not allow any data cells through until the sequence count had cycled round. For a 64 data cell sequence follows:

Plane 0 data 1, R, B, 4 ... 63, 0, ,1, 2

Plane 1 data 1, R, B, 4 ... 63, 0, ,1, 2

If data cells 2 and 3, for example, are lost in both planes, then the following data cells 4, 5, 6 ... 63, 0, 1 are rejected in the cycle resulting in a total loss of 64 data cells. This results in the needless prolongation of the original data cell-loss error condition.

SUMMARY OF THE INVENTION

An object of the present invention is to provide a method and apparatus for identifying valid data cells which does not suffer from the above mentioned disadvantage.

According to the present invention there is provided a method for identifying valid data cells comprising a call in a redundant path combining unit of an asynchronous transfer mode switch having duplicated switching planes, the method comprising the steps of:
  a) Identifying the plane from which came the last data cell to be passed in respect of a particular call,
  b) Checking that a sequence number associated with the data cell is not one greater than that stored in a storage means,
  c) Checking that the last data cell to be passed on the particular call was from the same plane,
  d) Checking if the data cell is a duplicate of the last data cell to arrive on this plane, and,
  e) Passing the data cell to an output store if (c) is true and (d) is not true and storing in the storage means the sequence number of the data cell.

According to the present invention there is provided an apparatus for executing the method as set forth above, comprising transceiver means arranged to receive and transmit data, a first store connected to the transceiver means and, arranged to store plane identification data and data cell sequence number data, a second store arranged to store a call identifier used to address the first store and a sequence number related to a particular call, for presentation to an addressed location in the first store, first comparator arranged to receive the sequence number from the second store and a sequence number form the first store and compare said numbers, a second comparator arranged to receive the sequence number from the second store, and the sequence number from the first store by way of an incrementer which is arranged to increment the sequence number by one, and compare said numbers, and data cell acceptance logic circuitry connected to the first and second comparators and arranged to generate read and write control signals for the first store, in accordance with output signals generated by the first and second comparators.

BRIEF DESCRIPTION OF THE DRAWINGS

An embodiment of the present invention will now be described with reference to the accompanying drawings in which.

DETAILED DESCRIPTION OF THE PREFERRED EMBODIMENTS

Figure 1:
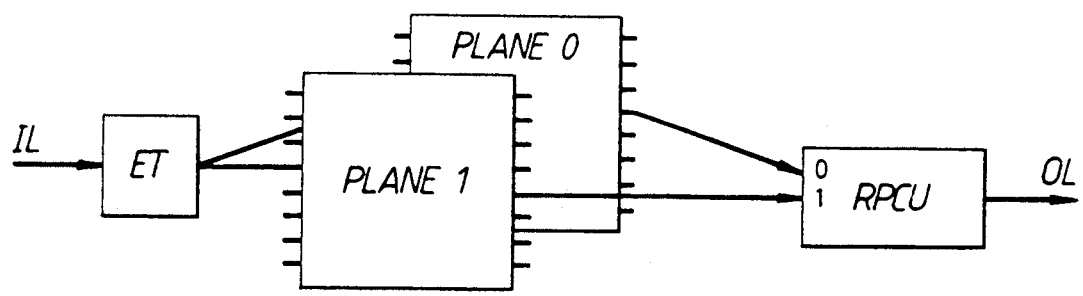
FIG. 1 shows parts of an asynchronous time mode switch incorporating duplicated switching planes.

Referring to FIG. 1, an exchange termination unit ET has each incoming line IL connected to it. The data cells pertaining to a call, received on the line IL are passed to both switching planes P0 and P1 and are then switched to an output of the respective plane and passed to a redundant path checking unit RPCU. The redundant path checking unit RPCU receives therefore, a duplicate of each data cell and it is arranged to decide whether the data cells received from plane 0, P0 or plane 1, P1 should be passed to an outgoing line OL or discarded as a duplicate.

Figure 2:
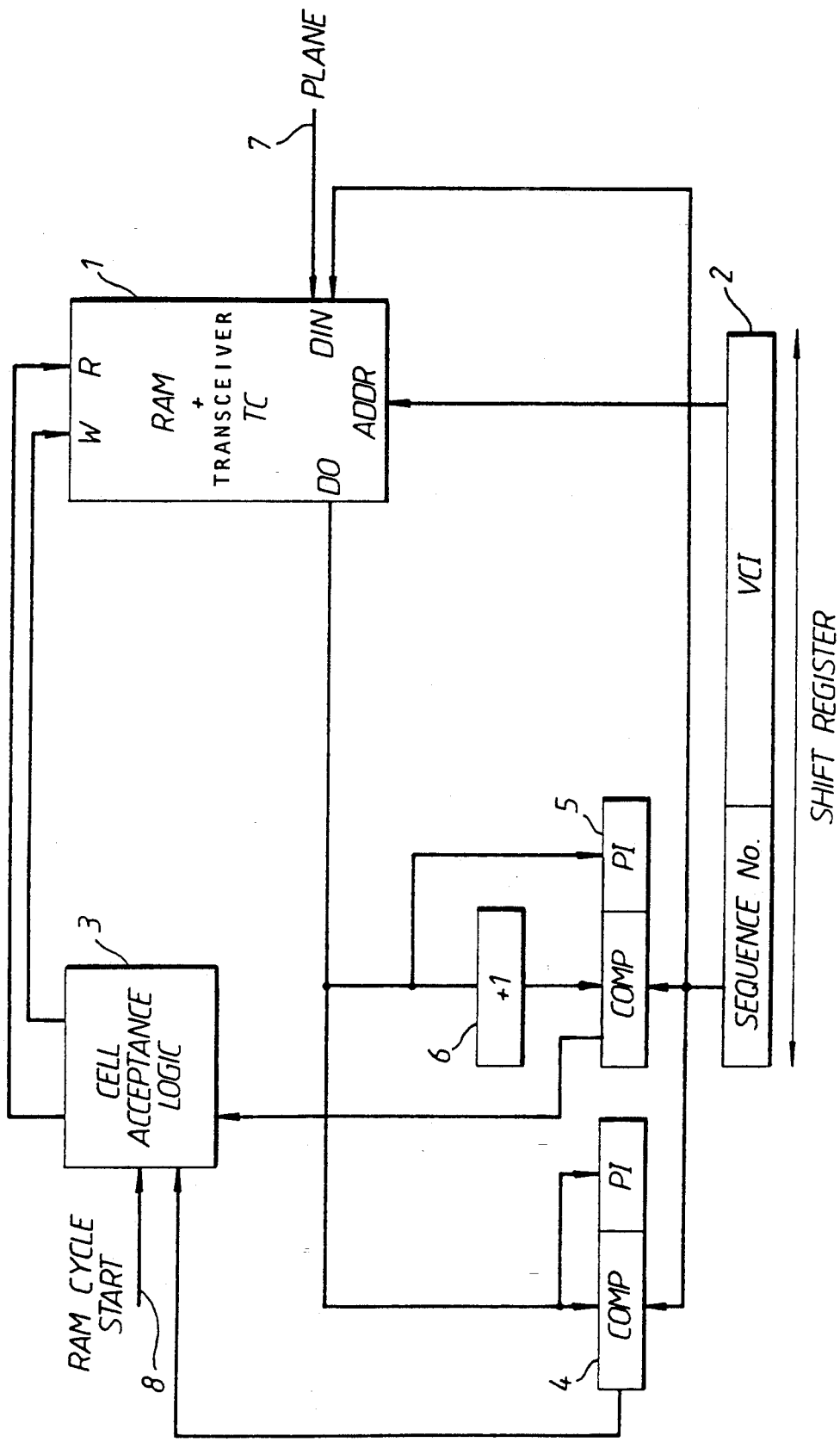
FIG. 2 shows part of the hardware incorporated in the redundant path combining unit necessary for executing the method.
Figure 3:
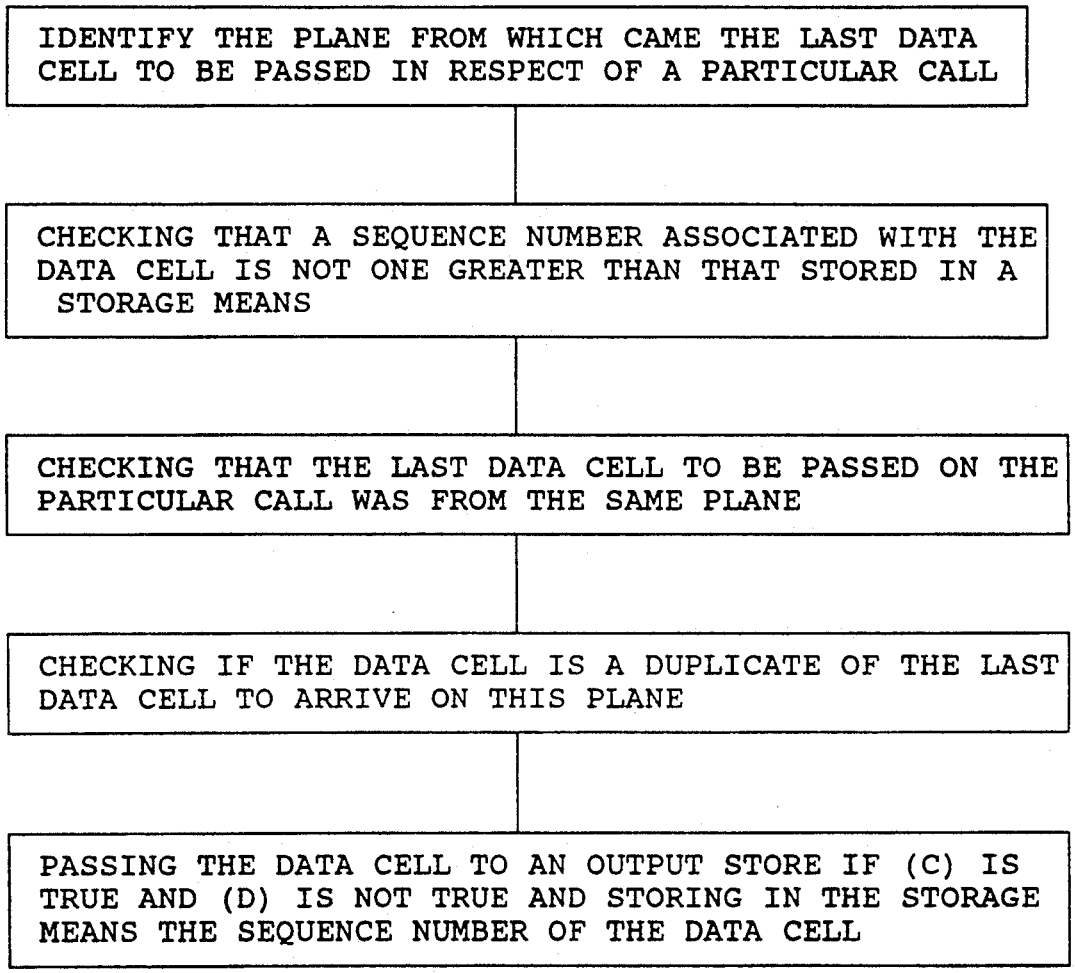
FIG. 3 is a flow chart of steps according to an embodiment of the method.

The redundant path checking unit RPCU achieves this by performing an algorithm. Each data cell has an associated sequence number, enabling duplicate data cells to be identified. The redundant path checking unit RPCU contains a look-up RAM 1 as shown in FIG. 2, in which the sequence number is stored for each data cell at an address which is identified by a virtual channel indicator VCI which is used to identify the call. The VCI and sequence number are temporarily stored in a shift register 2. The VCI is used to address the RAM 1, and the next sequence number together with a plane identifier PI from which the last data cell was accepted is written into the RAM under the control of data cell acceptance logic circuitry 3. The sequence number is applied to first and second comparators 4, 5 which also receive from the RAM 1, the expected sequence number stored for the VCI indicator, and the plane identifier, PI.

The sequence number applied to the comparator 5 from the RAM 1, is incremented by one by circuit 6. The output signals from the comparators 4, 5 are applied to the data cell acceptance logic circuitry 3 for controlling the read/write operation of the RAM 1.

The plane identifier PI is applied to the RAM 1 over line 7. The data cell acceptance logic 3 also receives a RAM cycle start signal over line 8. The RAM 1 has data written to it, and read from it by a transceiver, TC and is controlled by a microprocessor.

An example of how data cells could arrive at the redundant path checking unit RPCU is as follows:

1, 2, B, A, 5, 6 ... Plane 0

1, 2, B, A, 5, 6 ... Plane 1

The above represents the data cell sequence for plane 0 and plane 1. Assuming that the data cells shown crossed do not arrive at the redundant path checking unit RPCU because they are, lost due to faults or errors, and data cells 1 and 2 of plane 0 are accepted, data cell 5 is valid but is out of sequence because the redundant path checking unit is expecting the sequence number of data cell 3. Data cells 1 and 2 of plane 1 are rejected as they would be duplicates of data cells 1 and 2 accepted on plane 0.

The circuitry described above executes the following algorithm. The algorithm notes the plane from which cam the last data cell to be passed in respect of the particular VCI. If the data cell arrives from e.g. plane 0 and the sequence number is not one greater than that held in the RAM 1, then two further checks are made as follows:

1) Was the last data cell to be passed on this VCI from this plane?

2) Is this data cell a duplicate of the last data cell to arrive on this plane?

This can be detected as the sequence number of this data cell being the same as that stored in the RAM 1.

If 1 is true and 2 is not true, then the data cell is passed to an output FIFO in the transceiver and the sequence number stored in the RAM 1, is the sequence number of this data cell.

The redundant path checking unit RPCU accepts a data cell if the sequence number is the next in the sequence. The sequence number written back to the RAM 1 is that of the accepted data cell.

The algorithm is shown below in pseudo code:

```
BEGIN              Plane-sent-bit: = 0; (Set up variables)
                   Ram-seq-no: = 63;
When cell arrives on plane do Begin
Acceptance Loop    If cell-seq-no <> RAM-seq-no then Begin
Normal acceptance  If cell-seq-no = RAM-seq-no +1 then
                   Begin
                   Cell-accepted: = True;
                   RAM-seq-no: = cell-seq-no;
                   Plane-sent-bit: = This-plane;
                   End;
Out of Sequence    If Plane-sent-bit = This-plane then
                   Begin
                   Cell-accepted: = True;
                   Out-of-sequence; = True;
                   RAM-seq-no: = cell-seq-no;
                   End;
End; Else IF Plane-sent-bit = This-plane then
     Duplicate-cell-alarm: = True;
           END.
END.
```

| Variables: | cell-seq-no | The sequence number of this incoming cell. |
|---|---|---|
| | RAM-seq-no | The sequence number held in RAM for this VCI. |
| Plane-sent-bit | | The Plane from which the last cell on this VCI was accepted. |
| This-plane | | The plane that this cell has come from (0 or 1). |
| Cell-accepted | | Control variable to say whether this cell is passed to the output FIFO. |
| Duplicate-cell-alarm | | Indication to microprocesor that a cell which is a duplicate of the last cell on this call on this plane has arrived. |
| Out-of-sequence | | Indication to microprocessor that cells have been lost i.e. the cell sent is out of sequence. |

The algorithm does not cause a modulo 64 sequence loss to occur due to the situation described above with respect to the prior art, and the performance in other situations is equal to that of previously used algorithms.

I claim:

1. A method for identifying valid data cells comprising a call in a redundant path combining unit of an asynchronous transfer mode switch having duplicated switching planes, the method comprising the steps of:

a) identifying the plane from which came the last data cell to be passed in respect of a particular call, b) checking that a sequence number associated with the data cell is not one greater than that stored in a storage means, c) checking that the last data cell to be passed on the particular call was from the same plane, d) checking if the data cell is a duplicate of the last data cell to arrive on this plane, and e) passing the data cell to an output store if (c) is true and (d) is not true and storing in the storage means the sequence number of the data cell.

2. Apparatus for executing the method claimed in claim 1, comprising:

transceiver means arranged to receive and transmit data, a first store connected to the transceiver means and, arranged to store plane identification data and data cell sequence number data, a second store arranged to store a call identifier used to address the first store and a sequence number related to a particular call, for presentation to an addressed location in the first store, first comparator arranged to receive the sequence number from the second store and a sequence number form the first store and compare said numbers, a second comparator arranged to receive the sequence number from the second store, and the sequence number from the first store by way of an incrementer which is arranged to increment the sequence number by one, and compare said numbers, and data cell acceptance logic circuitry connected to the first and second comparators and arranged to generate read and write control signals for the first store, in accordance with output signals generated by the first and second comparators.

* * * * *